Patented June 13, 1950

2,511,804

UNITED STATES PATENT OFFICE 2,511,804

ANTIOXIDANT SALT

Lloyd A. Hall, Chicago, and Louis Sair, Evergreen Park, Ill., assignors to The Griffith Laboratories, Inc., a corporation of Illinois No Drawing. Application May 18, 1948, Serial No. 27,837

17 Claims. (Cl. 99—163)

This invention relates to a non-toxic antioxidant salt for use on food materials containing oils or fats and requiring salt, such as potato chips and nuts, and relates particularly to ordinary table salt having associated therewith an antioxidant acid, particularly of the class consisting of benzoic, fumaric, tartaric, phosphoric, ascorbic and citric acids, or combinations thereof, in combination with a gallic ester and a non-toxic polyhydric alcohol.

The antioxidant salt of this invention is particularly adaptable for use in and on foods containing edible fats. It is particularly applicable for use on foods that are cooked in fats at relatively high temperatures as the salt may be added after the cooking operation has been completed. In the past, it has been customary to add an antioxidant to the oil or fat prior to the cooking with the intention that the fat remaining in the food after the cooking operation contain some of the antioxidant and thus be stabilized. It has been found, however, that the high temperatures used in the cooking operation destroys or materially reduces the effect of the antioxidant material. As almost all foods that are cooked in heated fat are afterwards salted, it has been discovered that the antioxidant can be carried by the salt and thus dispersed on and through the cooked food. The antioxidant which is carried by the salt is then transferred to the oil and stabilizes the oil. The foods which are particularly applicable for treatment with the new antioxidant salt include potato chips and nuts as these two foods are ordinarily cooked in fat at high temperatures and salted rather heavily after they have been cooked.

In preparing the antioxidant composition of this invention, a non-toxic polyhydric alcohol such as propylene glycol or glycerine is used as a carrier for the gallic ester and the antioxidant acid. Both the ester and the acid are readily soluble in the alcohol and the resulting antioxidant composition readily adheres to the particles of salt and is thus easily dispersed on and through the fat when the salt is applied to or sprinkled on the food. All constituents of the antioxidant salt are anhydrous. The salt serves as a carrier for the antioxidant composition.

The gallic esters that may be used are preferably the methyl gallate, ethyl gallate, propyl gallate, butyl gallate, hexyl gallate, lauryl gallate and mixtures thereof.

In preparing the antioxidant, it is preferred that the following proportions be used:

Table I

| | Per cent |
|---|---|
| Gallic ester | 15 to 35 |
| Antioxidant acid | 15 to 35 |
| Non-toxic polyhydric alcohol | 70 to 30 |

All ingredients should be substantially anhydrous. In a preferred method of making the antioxidant, the polyhydric alcohol is warmed and the antioxidant acid is added thereto. The mixture is agitated until all the acid has been dissolved. Then one-half of the gallic ester is added and agitation is continued until this portion has been dissolved. Following this, the other half of the ester is added and the mixture agitated until the ester has been dissolved. The antioxidant composition is then added to dry, fine salt in the proportions of between about $\frac{1}{10}$ and 1% by weight of the salt. The salt and the antioxidant are agitated in an ordinary mixer until the antioxidant has been uniformly distributed over the salt. It is necessary that the final product be dry to the touch and be free flowing. The antioxidant salt will then preferably have the following proportions:

Table II

| | Per cent |
|---|---|
| Gallic ester | 0.015 to 0.35 |
| Antioxidant acid | 0.015 to 0.35 |
| Polyhydric alcohol | 0.070 to 0.30 |
| Salt | 99.900 to 99.00 |

In one embodiment of the invention 45 pounds of propylene glycol was heated to 125–135° F. and 25.5 pounds of citric acid was added. The mixture was agitated until all the acid had been dissolved. At this time 13.75 pounds of propyl gallate was added and the mixture stirred with continued heating until the propyl gallate was dissolved. Then 13.75 pounds more of propyl gallate was added with continued heating and the mixture agitated until this last portion had been dissolved. The antioxidant was then cooled. The anti-oxidant had the following proportions:

Table III

| | Per cent |
|---|---|
| Propyl gallate | 28.1 |
| Citric acid | 26.1 |
| Propylene glycol | 45.8 |

In preparing the salt, 100 pounds of fine, dry prepared salt was introduced into a mixer. 5.75 ounces (0.36 pound) of the above antioxidant was added to the salt in the mixer and the mixing was continued until the antioxidant had been uniformly distributed throughout the salt. In a specific embodiment, uniformity was achieved after from 15 to 20 minutes of mixing. At the end of the mixing time the final product should be tested to see that it is dry to the touch and is free flowing. The antioxidant salt will have the following proportions:

Table IV

| | Per cent |
|---|---|
| Propyl gallate | 0.101 |
| Citric acid | 0.094 |
| Propylene glycol | 0.165 |
| Salt | 99.640 |

After the antioxidant salt has been prepared, it can be exposed to air at room temperature for a relatively great length of time without any appreciable reduction in the activity of the salt. It is preferred, however, that it not be exposed to air for more than approximately one month.

Any amounts of the salt desired may be used on the foods. In preparing potato chips, for example, approximately 3–5% by weight of salt is ordinarily added to the chips. The cooked chips themselves ordinarily contain about 40% oil by weight. Thus 100 pounds of prepared potato chips will contain approximately 40 pounds of the oil.

In another embodiment of the invention an antioxidant composition was prepared containing 24.8 pounds (24.1%) of propyl gallate, 25.5 pounds (24.7%) of anhydrous citric acid, and 52.7 pounds (51.2%) of propylene glycol. This antioxidant was prepared by the method set forth hereinabove. It was found that the addition of 0.405 pounds (0.4%) of this antioxidant to 100 pounds (99.6%) of dry salt produced a free-flowing salt product having the following proportions:

Table V

| | Per cent |
|---|---|
| Propyl gallate | 0.096 |
| Citric acid | 0.099 |
| Propylene glycol | 0.205 |
| Salt | 99.600 |

In using the salt, potato chips were deep fried in lard at a temperature of 350–375° F. Each lot of fried chips was divided into two portions. 5% of regular salt was added to one portion and 5% of the antioxidant salt was added to the second portion. Both portions of salted chips were then stored in an incubator at 140° F. The chips were then checked for peroxide values and odor as well as taste at the end of various times. The following results were obtained:

Table VI

| Days of Storage at 140° F. | Peroxide Value of Lard | |
|---|---|---|
| | Salt with no Antioxidant | Antioxidant Salt |
| 3 | 150 (very rancid) | 10 (good). |
| 4 | 193 | 37.5 (slightly off). |
| 5 | | 67. |

The above tests show that within three days the lard in the potato chips on which no antioxidant was used was very rancid with the lard having a peroxide value of 150. After five days the lard on the chips containing the antioxidant salt had a peroxide value of only 67.

Potato chips were also fried in corn oil at a temperature of 350–375° F. The procedure followed was the same as that given above with respect to the lard. The effect of the antioxidant salt in retarding rancidity in the oil in the potato chips is shown in the following table:

Table VII

| Days of Storage at 140° F. | Peroxide Value of Corn oil | |
|---|---|---|
| | Salt with no antioxidant | Antioxidant salt |
| 0 | 0 | 0. |
| 2 | 0 | 0. |
| 6 | 4.5 | 4.0. |
| 8 | 12.2 | 6.5. |
| 10 | 19.0 (odor slightly off) | 10.8. |
| 11 | 45 (smells quite rancid) | 19. |
| 12 | 70 (very rancid) | 30 (good). |
| 17 | 130 | 39 (very slightly off). |
| 21 | | 90 (rancid). |

These tests show that the oil was rancid in the potato chips on which no antioxidant was used while those on which the antioxidant salt was used were only very slightly off in odor and taste after 17 days and did not become rancid until 21 days.

Tests were conducted with the new antioxidant salt on cooked nuts. In one test 10 pounds of red-coat peanuts were cooked in hydrogenated cottonseed oil at 400–430° F. At the end of the cooking, 1.5 ounces of butter were added to the cooked nuts and then 3 ounces of the new antioxidant salt were mixed in with one-half of the nuts and the same amount of regular salt was mixed in with the other half of the nuts. Both portions were incubated at 140° F. The peroxide values of both portions of nuts were determined at intervals. The peroxide values, determining rancidity development, were recorded as ml. of 0.002 N thiosulfate required for 1 gm. of unground nuts. The following results were obtained:

Table VIII

| Days of Storage at 140° F. | Ml. of Thiosulfate per gm. of nuts | |
|---|---|---|
| | Salt with no Antioxidant | Antioxidant Salt |
| 2 | 0.55 ml. (off) | zero ml. (good). |
| 3 | 0.80 ml. (rancid) | Do. |
| 4 | 1.2 ml. (very rancid) | Do. |
| 12 | | Do. |
| 17 | | Do. |
| 24 | | 0.65 ml. (little off). |

Similar tests were conducted by using pecans as the nuts. The following results were obtained:

Table IX

| Days of Storage at 140° F. | Ml. of Thiosulfate per gm. of nuts | |
|---|---|---|
| | Salt with no Antioxidant | Antioxidant Salt |
| 3 | slightly off | good. |
| 4 | 0.25 ml. (off) | zero ml. (good). |
| 7 | 0.40 ml (off) | Do. |
| 9 | 1.50 ml. (rancid) | Do. |
| 14 | 3.0 ml. (very rancid) | Do. |
| 21 | | Do. |
| 28 | | Do. |
| 35 | | Do. |

Similar tests were conducted on cashew nuts and the following results were obtained:

Table X

| Days of Storage at 140° F. | Ml. of Thiosulfate per gm. of nuts | |
|---|---|---|
| | Salt with no Antioxidant | Antioxidant Salt |
| 3 | Good | Good. |
| 4 | 0.1 ml. (slightly off) | zero ml. (good). |
| 7 | zero ml. (good) | Do. |
| 9 | zero ml. (good) | Do. |
| 14 | 0.3 ml. (slightly off) | Do. |
| 21 | 0.4 ml. (off) | Do. |
| 28 | 0.4 ml. (off) | trace off. |

In general, the preferred gallates are propyl, lauryl, and hexyl gallates while the preferred antioxidant acids are citric, ascorbic and phosphoric acids.

The foregoing detailed description is given for clearness of understanding only, and no unnecessary limitations should be understood therefrom, for some modifications will be obvious to those skilled in the art.

We claim:

1. An antioxidant composition comprising about 0.015 to 0.35% by weight of an antioxidant acid of the class consisting of benzoic, fumaric, tartaric, phosphoric, ascorbic and citric acids, about 0.015 to 0.35% of a gallic ester of the class consisting of methyl, ethyl, propyl, butyl, hexyl and lauryl gallates, and about 0.070 to 0.30% of a non-toxic polyhydric alcohol associated with a carrier for the antioxidant comprising table salt, said proportions being by weight of the composition including the table salt.

2. The antioxidant composition of claim 1 wherein the alcohol comprises propylene glycol.

3. The antioxidant of claim 1 wherein the alcohol comprises glycerine.

4. The antioxidant composition of claim 1 wherein the antioxidant acid comprises citric acid.

5. The antioxidant composition of claim 1 wherein the antioxidant acid comprises ascorbic acid.

6. The antioxidant composition of claim 1 wherein the antioxidant acid comprises phosphoric acid.

7. The antioxidant composition of claim 1 wherein the ester comprises propyl gallate.

8. The antioxidant composition of claim 1 wherein the ester comprises lauryl gallate.

9. The antioxidant composition of claim 1 wherein the ester comprises hexyl gallate.

10. An antioxidant composition comprising from 0.015 to 0.35% by weight of an antioxidant acid of the class consisting of benzoic, fumaric, tartaric, phosphoric, ascorbic, and citric acids, from 0.015 to 0.35% of a gallic ester of the class consisting of methyl, ethyl, propyl, butyl, hexyl and lauryl gallates, and from 0.070 to 0.30% of propylene glycol associated with 99.9 to 99.0% of table salt as a carrier.

11. A fatty food in combination with an antioxidant comprising about 0.015 to 0.35% by weight of an antioxidant acid of the class consisting of benzoic, fumaric, tartaric, phosphoric, ascorbic and citric acids, about 0.015 to 0.35% of a gallic ester of the class consisting of methyl, ethyl, propyl, butyl, hexyl and lauryl gallates, about 0.070 to 0.30% of a non-toxic polyhydric alcohol, and a carrier for the antioxidant comprising table salt, said proportions being by weight of the composition including the table salt.

12. The combination of claim 11 wherein the fatty food comprises cooked nuts.

13. The combination of claim 11 wherein the fatty food comprises cooked potato chips.

14. A fatty food in combination with an antioxidant comprising from 0.015 to 0.35% by weight of an antioxidant acid of the class consisting of benzoic, fumaric, tartaric, phosphoric, ascorbic and citric acids, from 0.015 to 0.35% of a gallic ester of the class consisting of methyl, ethyl, propyl, butyl, and lauryl gallates, from 0.070 to 0.30% of propylene glycol and 99.9 to 99.0% of table salt as a carrier.

15. The combination of claim 14 wherein the fatty food comprises cooked potato chips.

16. The combination of claim 14 wherein the fatty food comprises cooked nuts.

17. A substantially dry free-flowing table salt having distributed therethrough and carried thereby an anti-oxidant composition comprising as the active antioxidant ingredients approximately equal proportions of an ester of the class consisting of methyl, ethyl, propyl, butyl, hexyl and lauryl gallates and an acid of the class consisting of benzoic, fumaric, tartaric, phosphoric, ascorbic and citric acids, together with a non-toxic polyhydric alcohol in an amount approximately double the amount of said ester.

LLOYD A. HALL.
LOUIS SAIR.

REFERENCES CITED

The following references are of record in the file of this patent:

UNITED STATES PATENTS

| Number | Name | Date |
|---|---|---|
| 1,831,728 | Working | Nov. 10, 1931 |
| 2,029,248 | Musher | Jan. 28, 1936 |
| 2,334,401 | Fitzpatrick | Nov. 16, 1943 |
| 2,444,307 | Penn | June 29, 1948 |

OTHER REFERENCES

Bergel, Chem. & Ind., Apr. 1944, pages 127–128.
Riemenschneider, Trans. Am. Assoc. Cereal Chem., p. 57, Apr. 1947.